(12) United States Patent
Sun et al.

(10) Patent No.: US 11,580,512 B2
(45) Date of Patent: Feb. 14, 2023

(54) SMART STREET PARKING METER, SMART STREET PARKING MANAGEMENT SYSTEM, AND SMART STREET PARKING FEE PAYMENT METHOD

(71) Applicant: National Formosa University, Yunlin County (TW)

(72) Inventors: Chi-Chia Sun, Yunlin County (TW); Yong-Ye Lin, Yunlin County (TW)

(73) Assignee: National Formosa University, Yunlin County (TW)

( * ) Notice: Subject to any disclaimer, the term of this patent is extended or adjusted under 35 U.S.C. 154(b) by 370 days.

(21) Appl. No.: 16/874,695

(22) Filed: May 15, 2020

(65) Prior Publication Data
US 2021/0224769 A1 Jul. 22, 2021

(30) Foreign Application Priority Data

Jan. 16, 2020 (TW) ................................. 109101436

(51) Int. Cl.
| | |
|---|---|
| *G06Q 20/12* | (2012.01) |
| *G06Q 20/08* | (2012.01) |
| *G07B 15/02* | (2011.01) |
| *G06Q 20/32* | (2012.01) |
| *G06N 20/00* | (2019.01) |

(Continued)

(52) U.S. Cl.
CPC ............ *G06Q 20/127* (2013.01); *G01S 13/04* (2013.01); *G01S 17/04* (2020.01); *G06N 5/04* (2013.01); *G06N 20/00* (2019.01); *G06Q 20/085* (2013.01); *G06Q 20/3223* (2013.01); *G07B 15/02* (2013.01); *G08G 1/144* (2013.01); *G08G 1/147* (2013.01); *G06Q 2240/00* (2013.01)

(58) Field of Classification Search
CPC ............... G06Q 20/127; G06Q 20/085; G06Q 20/3223; G06Q 2240/00; G06Q 20/145; G06Q 20/18; G06Q 20/3278; G06Q 20/34; G01S 13/04; G01S 17/04; G01S 13/865; G01S 17/86; G06N 5/04; G06N 20/00; G07B 15/02; G08G 1/144; G08G 1/147; G08G 1/0175; G07C 1/30; G07F 17/24; G07F 17/248; G07F 17/246
USPC .......................................................... 705/13
See application file for complete search history.

(56) References Cited

U.S. PATENT DOCUMENTS

| | | | | |
|---|---|---|---|---|
| 5,642,119 A | * | 6/1997 | Jacobs | ..................... G07D 3/14 342/69 |
| 8,727,207 B1 | * | 5/2014 | Church | ................... G07F 17/24 235/375 |

(Continued)

*Primary Examiner* — Omar Casillashernandez

(57) ABSTRACT

A smart street parking management system includes a smart street parking meter a smart cloud parking management server connected to the smart street parking meter through a wireless networking technology and configured to regularly receive parking information of a vehicle parked on a smart street parking grid and status information of the smart street parking meter uploaded by the smart street parking meter. The status information of the smart street parking meter includes an empty-space status of the street parking grid detected by the smart street parking meter and a battery status of a rechargeable battery of the smart street parking meter. The parking information of the vehicle includes the plate number of the vehicle, the parking fee of the vehicle, and a payment status of the parking fee of the vehicle.

9 Claims, 3 Drawing Sheets

(51) Int. Cl.
  *G01S 13/04*   (2006.01)
  *G01S 17/04*   (2020.01)
  *G08G 1/14*   (2006.01)
  *G06N 5/04*   (2023.01)

(56) References Cited

U.S. PATENT DOCUMENTS

| | | | |
|---|---|---|---|
| 2003/0169183 A1* | 9/2003 | Korepanov | G07F 17/246 340/932.2 |
| 2005/0155839 A1* | 7/2005 | Banks | G07B 15/02 194/302 |
| 2011/0015814 A1* | 1/2011 | Starr | B60L 53/16 320/101 |
| 2012/0078686 A1* | 3/2012 | Bashani | G07B 15/00 348/148 |
| 2014/0039987 A1* | 2/2014 | Nerayoff | H04N 7/181 348/148 |
| 2014/0343891 A1* | 11/2014 | Becker | G08G 1/147 702/150 |
| 2016/0078759 A1* | 3/2016 | Nerayoff | G06V 20/593 701/3 |
| 2017/0011631 A1* | 1/2017 | Nordbruch | G08G 1/042 |
| 2019/0057372 A1* | 2/2019 | Batten | G06Q 20/386 |
| 2019/0108700 A1* | 4/2019 | Chelnik | G07B 15/02 |
| 2019/0304307 A1* | 10/2019 | Huang | G08G 1/205 |
| 2020/0005649 A1* | 1/2020 | Kim | G08G 1/168 |
| 2020/0250977 A1* | 8/2020 | Kim | G08G 1/148 |
| 2021/0034060 A1* | 2/2021 | Patnaik | G08G 1/096725 |
| 2021/0197801 A1* | 7/2021 | Oh | G05D 1/0214 |
| 2021/0224769 A1* | 7/2021 | Sun | G07F 17/248 |
| 2021/0327129 A1* | 10/2021 | Raproeger | G06T 7/70 |

* cited by examiner

SMART STREET PARKING METER, SMART STREET PARKING MANAGEMENT SYSTEM, AND SMART STREET PARKING FEE PAYMENT METHOD

FIELD OF THE INVENTION

The present invention relates to a street parking meter, a parking management system and a parking fee payment method, and more particularly to a smart street parking meter, a smart parking management system and a smart parking fee payment method that can provide smart management through the Internet of Things technology.

BACKGROUND OF THE INVENTION

The current street parking system is mainly based on manual fee collection or pay by vehicle owners at the payment machine. For example, in Taiwan, the parking bill is sandwiched between the windshield and the wiper and may disappear due to wind, which may cause the vehicle owner to be charged an additional fee due to the overdue. In the U.S., the vehicle owner must go to the payment machine for paying by coin or credit card, which may cause the vehicle owner spend extra time.

Therefore, in order to reduce the labor cost, manual billing errors and facilitate vehicle owners, the important topics in this technical field is how to introduce the street parking management system, an application for drivers to search for street parking grids and the digital payment technology to pay parking fees, thereby achieving some advantages such as recording the vehicle information of vehicles parked on the street parking grid and managing the status of the street parking grids, reducing labor costs, assisting drivers to quickly search for parking spaces to reduce vehicle pollution, and providing drivers with multiple ways to pay parking fees to reduce payment time.

SUMMARY OF THE INVENTION

An embodiment of the present invention provides a smart street parking meter, which includes an integrated artificial intelligence recognition module, a central processing unit, a near-end payment circuit, a touch screen, a wireless networking circuit and a power supply circuit. The integrated artificial intelligence recognition module is configured to detect a vehicle parked on at least one street parking grid. The integrated artificial intelligence recognition module includes a radar detection circuit, a lidar detection circuit and an image recognition circuit. The integrated artificial intelligence recognition module selects at least one of the radar detection circuit, the lidar detection circuit and the image recognition circuit to detect the vehicle parked on the at least one street parking grid. The central processing unit is connected to the integrated artificial intelligence recognition module and configured to calculate a parking time from when the vehicle is parked on the at least one street parking grid to when the vehicle leaves the at least one street parking grid and convert the parking time of the vehicle into a parking fee of the vehicle. The near-end payment circuit is connected to the central processing unit and configured to identify a plate number of the vehicle parked on the at least one street parking grid and pay the parking fee for the vehicle. The touch screen is connected to the central processing unit and configured to display parking information of the vehicle and provide a driver of the vehicle to select a near-end payment method for the parking fee of the vehicle. The wireless networking circuit is connected to the central processing unit and configured to regularly upload the parking information of the vehicle and status information of the smart street parking meter to a smart cloud parking management server through a wireless networking technology to record the parking information of the vehicle and the status information of the smart street parking meter, and the power supply circuit is connected to and configured to provide power to the integrated artificial intelligence identification module, the central processing unit, the near-end payment circuit, the touch screen and the wireless networking circuit.

An embodiment of the present invention further provides a smart street parking management system, which includes at least one aforementioned smart street parking meter and the aforementioned smart cloud parking management server. The smart cloud parking management server is connected to the at least one smart street parking meter through the wireless networking technology and configured to regularly receive the parking information of the vehicle parked on the at least one smart street parking grid and the status information of the at least one smart street parking meter uploaded by the at least one smart street parking meter to record the parking information of the vehicle and the status information of the at least one smart street parking meter. The status information of the at least one smart street parking meter includes an empty-space status of the at least one street parking grid detected by the at least one smart street parking meter and a battery status of a rechargeable battery of the at least one smart street parking meter. The parking information of the vehicle includes the plate number of the vehicle, the parking fee of the vehicle, and a payment status of the parking fee of the vehicle.

An embodiment of the present invention further provides a smart street parking fee payment method, which is applicable to the aforementioned smart street parking management system. The smart street parking fee payment method includes steps of: determining that the vehicle is parked on the at least one street parking grid and switching the at least one smart street parking meter from a sleep mode to an operating mode; initializing the at least one smart street parking meter; identifying the plate number of the vehicle parked on the at least one street parking grid; calculating the parking time of the vehicle parked on the at least one street parking grid; determining that the vehicle leaves the at least one street parking grid; converting the parking time of the vehicle into the parking fee for the vehicle; determining that the parking fee for the vehicle has been paid through the near-end payment method and uploading the plate number of the vehicle, the parking fee for the vehicle, and the payment status of the parking fee for the vehicle; and switching the at least one smart street parking meter to the sleep mode from the operating mode when it is determined that no vehicle is parked on the at least one street parking grid.

In order to make the above and other objects, features and advantages of the present invention become more apparent and obvious, the preferred embodiments will be described in detail with reference to the accompanying drawings hereinafter.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
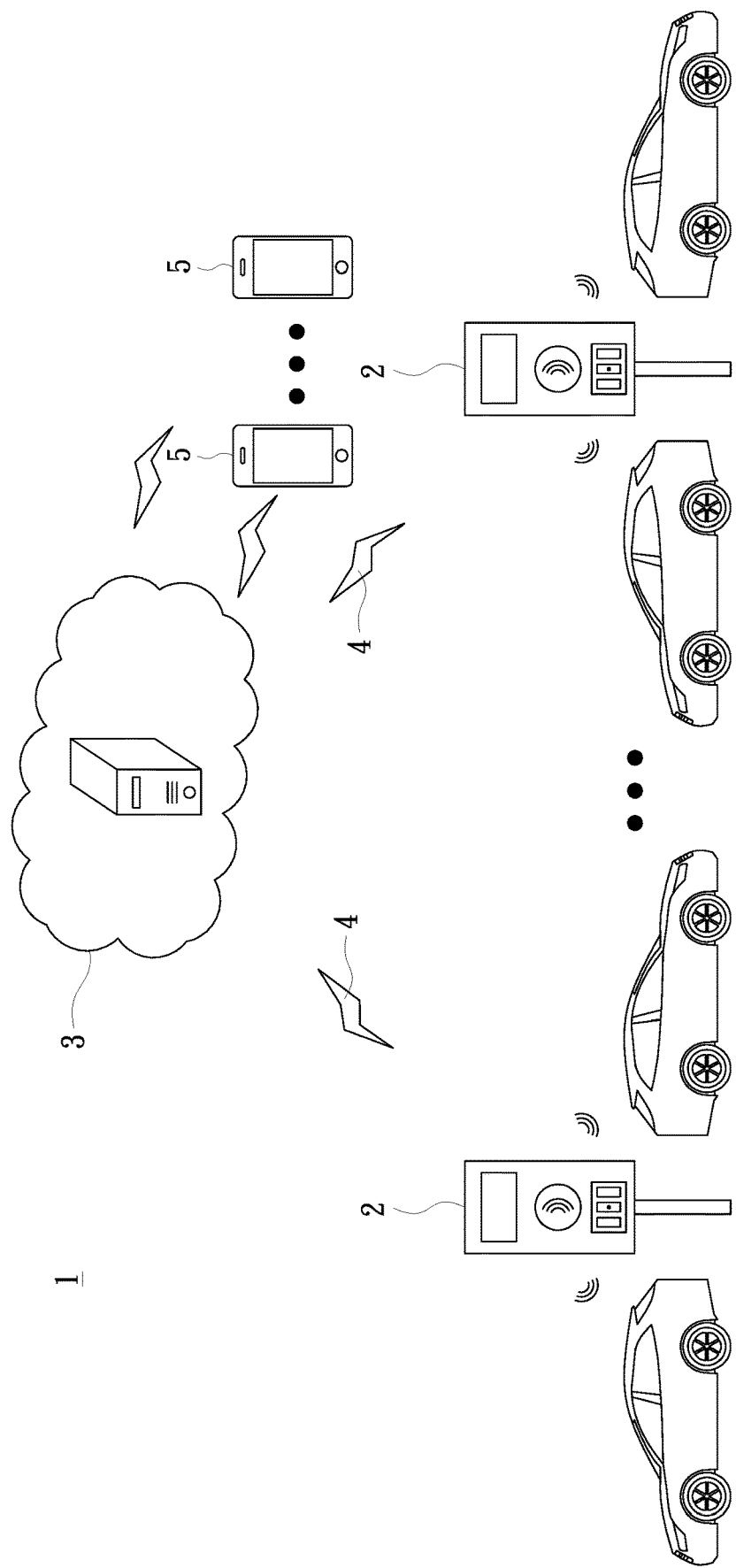
FIG. 1 is a schematic diagram of a smart street parking management system according to an embodiment of the present invention.

FIG. 1 is a schematic diagram of a smart street parking management system according to an embodiment of the present invention. As shown in FIG. 1, the smart street parking management system 1 provided by an embodiment of the present invention includes at least one smart street parking meter 2, a smart cloud parking management server 3, and at least one smart handheld device 5. The smart cloud parking management server 3 is connected to the at least one smart street parking meter 2 through a wireless networking technology 4. In this embodiment, the at least one smart street parking meter 2 is exemplified by only one smart street parking meter 2, but the present invention does not limit the quantity of the at least one smart street parking meter 2. In this embodiment, the smart street parking meter 2 is configured to record parking information of a vehicle parked on at least one street parking grid and status information of the smart street parking meter 2 itself and upload the parking information of the vehicle parked on the at least one street parking zone and the status information of the smart street parking meter 2 itself to the smart cloud parking management server 3 through the wireless networking technology 4. Each smart street parking meter 2 can detect two or more vehicles. In this embodiment, the smart street parking meter 2 only detects one vehicle as an example, but the present invention is not limited thereto. The smart cloud parking management server 3 receives the parking information of the vehicle parked on the street parking grid and the status information of the smart street parking meter 2 uploaded by this smart street parking meter 2 through the wireless networking technology 4 and records the parking information of the vehicle parked on the street parking grid and the status information of this smart street parking meter 2. The wireless networking technology 4 is, for example, the Internet of Things (IoT) technology or other wireless communication technologies, preferably the Internet of Things technology. The wireless networking technology 4 is configured to achieve the connection between the smart cloud management server 3 and the smart street parking meter 2, and the present invention does not limit the wireless networking technology.

It is to be noted that the status information of the smart street parking meter 2 includes an empty-space status of the street parking grid detected by this smart street parking meter 2, a battery status of a rechargeable battery of this smart street parking meter 2, and/or a working status of the modules and circuits in this smart street parking meter 2, so that the smart cloud parking management server 3 can effectively manage the status of the smart street parking meter 2, thereby facilitating the subsequent manual maintenance, repair, replacement, etc. The parking information of a vehicle parked on the street parking grid includes the plate number of the vehicle, the parking fee for the vehicle, the payment status of the parking fee for the vehicle, the style, type, parking frequency of the vehicle, the payment method for the driver of the vehicles and/or the parking fee discounts, etc., so that the smart cloud parking management server 3 can effectively manage the payment status of the vehicle parked on the street parking grid.

In this embodiment, the at least one smart handheld device 5 of the smart street parking management system 1 is held by a driver of the vehicle. The at least one smart handheld device 5 has an application provided by the smart cloud parking management server 3, so that the driver of the vehicle can connect to the smart cloud parking management server 3 through the application provided by the smart cloud parking management server 3 in the at least one smart handheld device 5 to query the empty-space status of the street parking grid detected by the at least one smart street parking meter 2. Then, the smart street parking management system 1 searches for the nearest street parking grid having the empty-space status according to the location of the vehicle or searches for the street parking grid having the empty-space status according to the conditions set by the driver. Finally, the smart cloud parking management server 3 guides the driver of the vehicle to the street parking grid having the empty-space status to park the vehicle.

Figure 2:
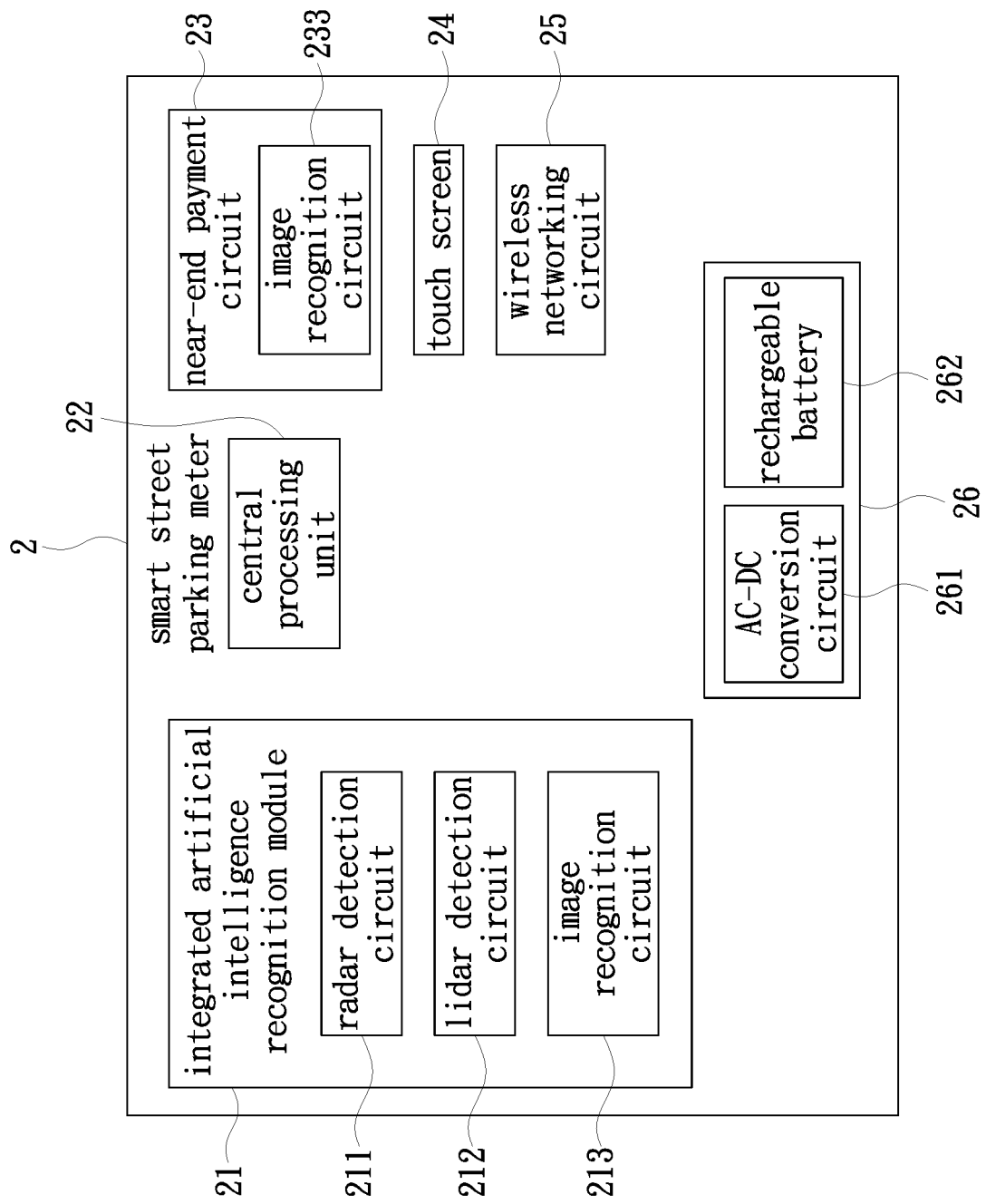
FIG. 2 is a schematic block diagram of a smart street parking meter according to an embodiment of the present invention.

FIG. 2 is a schematic block diagram of a smart street parking meter according to an embodiment of the present invention. As shown in FIG. 2, the smart street parking meter 2 provided by an embodiment of the present invention includes an integrated artificial intelligence recognition module 21, a central processing unit 22, a near-end payment circuit 23, a touch screen 24, a wireless networking circuit 25 and a power supply circuit 26.

The integrated artificial intelligence recognition module 21 is configured to detect the vehicle parked on the street parking grid. The integrated artificial intelligence recognition module 21 includes a radar detection circuit 211, a lidar detection circuit 212 and an image recognition circuit 213. The integrated artificial intelligence recognition module 21 uses at least one of the radar detection circuit 211, the lidar detection circuit 212 and the image recognition circuit 213 to detect the vehicle parked on the street parking grid, and may further detect the style and type of the vehicle, such as sedan cars, RVs, trucks, motorcycles, etc. It is to be noted that most of the street parking grids detected by the integrated artificial intelligence recognition module 21 are open-air street parking grids. Therefore, in order to overcome weather and time factors, the integrated artificial intelligence recognition module 21 combines the radar detection circuit 211, the lidar detection circuit 212 and the image recognition circuit 213 to detect vehicle parked on the street parking grid. For example, the integrated artificial intelligence recognition module 21 selects the lidar detection circuit 212 and/or the image recognition circuit 213 to detect the vehicle parked on the street parking grid when the weather condition is rainy and there is a vehicle parked on the street parking grid; and the integrated artificial intelligence recognition module 21 selects the radar detection circuit 211 and/or the image identification circuit 213 to detect the vehicle parked on the street parking grid when the time status is the evening sunset and there is a vehicle parked on the street parking grid. The aforementioned integrated artificial intelligence identification module 21 selecting different detection circuits and/or identification circuits to detect whether there is a vehicle parked on the street parking grid according to the above-mentioned weather and time factors is only an example. The integrated artificial intelligence identification module 21 may further select different detection circuits and/or identification circuits to detect whether there is a vehicle parked on the street parking grid according to different environmental conditions, and the present invention is not limited thereto. In other words, in order to detect whether there is a vehicle parked on the street parking grid, the integrated artificial intelligence recognition module 21 can select at least one of the radar detection circuit 211, the lidar detection circuit 212 and the image recognition circuit 213 to detect the vehicle parked on the street parking grid according to different weather, time factors and/or environmental factors.

The central processing unit 22 is connected to the integrated artificial intelligence recognition module 21. The central processing unit 22 is configured to calculate a parking time from the time when the vehicle is parked on the street parking grid to the time when the vehicle leaves the street parking grid, obtain the corresponding unit price of the parking fee of the vehicle according to the style or type of the vehicle, and convert the parking time of the vehicle into a parking fee of the vehicle.

The near-end payment circuit 23 is connected to the central processing unit 22. The near-end payment circuit 23 is configured to identify the plate number of a vehicle parked on the street parking grid and pay the parking fee of the vehicle. When wanting to drive the vehicle away from the street parking grid, the driver of the vehicle can use the near-end payment method at the near-end payment circuit 23 of the smart street parking meter 2 to pay the parking fee for the vehicle parked on the street parking grid. The near-end payment circuit 23 includes an image recognition circuit 233 configured to identify the plate number of a vehicle parked on the street parking grid. Preferably, in order to save the hardware space of the smart street parking meter 2, the near-end payment circuit 23 may not include the image recognition circuit 233 but use the image recognition circuit 213 of the integrated artificial intelligence recognition module 21 to identify the plate number of the vehicle parked on the street parking grid. In addition, the near-end payment method may include near-field communication (NFC) technologies and digital payment technologies such as Apple Pay, Google Pay, Samsung Pay, Easy Card, All-in-One Card, credit card, and Line Pay, so that the driver can perform the near-end payment method at the smart street parking meter 2 for the parking fee of the vehicle parked on the street parking grid, wherein the present invention does not limit the near-end payment method.

The touch screen 24 is connected to the central processing unit 22. The touch screen 22 is configured to display the parking information of the vehicle and provide the driver of the vehicle to select a near-end payment method for the parking fee of the vehicle. The near-end payment method is as described above, and no redundant detail is to be given herein.

The wireless networking circuit 25 is connected to the central processing unit 22. The wireless networking circuit 25 is configured to regularly upload the parking information of the vehicle and the status information of the smart street parking meter 2 to the smart cloud parking management server 3 through the wireless networking technology 4 to record the parking information of the vehicle and the status information of the smart street parking meter 2. The wireless networking circuit 25 uploads the parking information of the vehicle and the status information of the smart street parking meter 2 periodically, such as 30 seconds, 1 minute, 5 minutes, or 10 minutes. The smart street parking meter 2 can adjust the upload period or frequency according to the status information of the smart street parking meter 2, and the present invention does not limit the upload period or frequency. The parking information of the vehicle and the status information of the smart street parking meter 2 are as described above, and no redundant detail is to be given herein.

The power supply circuit 26 is connected to and configured to provide power to the integrated artificial intelligence identification module 21, the central processing unit 22, the near-end payment circuit 23, the touch screen 24 and the wireless networking circuit 25. The power supply circuit 26 includes an AC-DC conversion circuit 261 and a rechargeable battery 262. The AC-DC conversion circuit 261 is connected to the rechargeable battery 262 and configured to charge the rechargeable battery 262 and provide power to the smart street parking meter 2. Alternatively, the AC-DC conversion circuit 261 is connected to the rechargeable battery 262 to recharge the rechargeable battery 262, and then the rechargeable battery 262 provides power to the smart street parking meter 2.

In an embodiment, the smart street parking meter 2 is switched from an operating mode to a sleep mode to save the power of the rechargeable battery 262 when the central processing unit 22 determines that no vehicle is parked on the street parking grid within a specific time. The aforementioned specific time can be an interval of 30 seconds, 1 minute, 5 minutes, or 10 minutes. The smart street parking meter 2 can adjust the aforementioned specific time to switch to the sleep mode from the operating mode according to the status information of this smart street parking meter 2, so the present invention does not limit the length of the aforementioned specific time. In the sleep mode, the integrated artificial intelligence recognition module 21 of the smart street parking meter 2 is in a working state to continuously detect whether there is a vehicle parked on the street parking grid, and meanwhile the central processing unit 22, the near-end payment circuit 23, the touch screen 24 and the wireless networking circuit 25 of the smart street parking meter 2 are in a sleep state to save power. The smart street parking meter 2 returns from the sleep mode to the operating mode when the integrated artificial intelligence recognition module 21 detects that there is a vehicle parked on the street parking grid. The central processing unit 22 initializes the smart street parking meter 2 to start to identify the plate number of the vehicle, calculate the parking time of the vehicle, calculate the parking fee of the vehicle, and also detect whether the battery status of the rechargeable battery 262 of the power supply circuit 26 is sufficient to supply power to the smart street parking meter 2. When determining that the battery status of the rechargeable battery 262 of the power supply circuit 26 is insufficient to supply power to the smart street parking meter 2, the central processing unit 22 uploads the status information indicating that the battery status of the rechargeable battery 262 of the power supply circuit 26 is poor to the smart cloud parking management server 3 through the wireless networking circuit 25, and the smart cloud parking management server 3 notifies maintenance personnel to perform maintenance, repair, replacement, etc. of this smart street parking meter 2.

Figure 3:
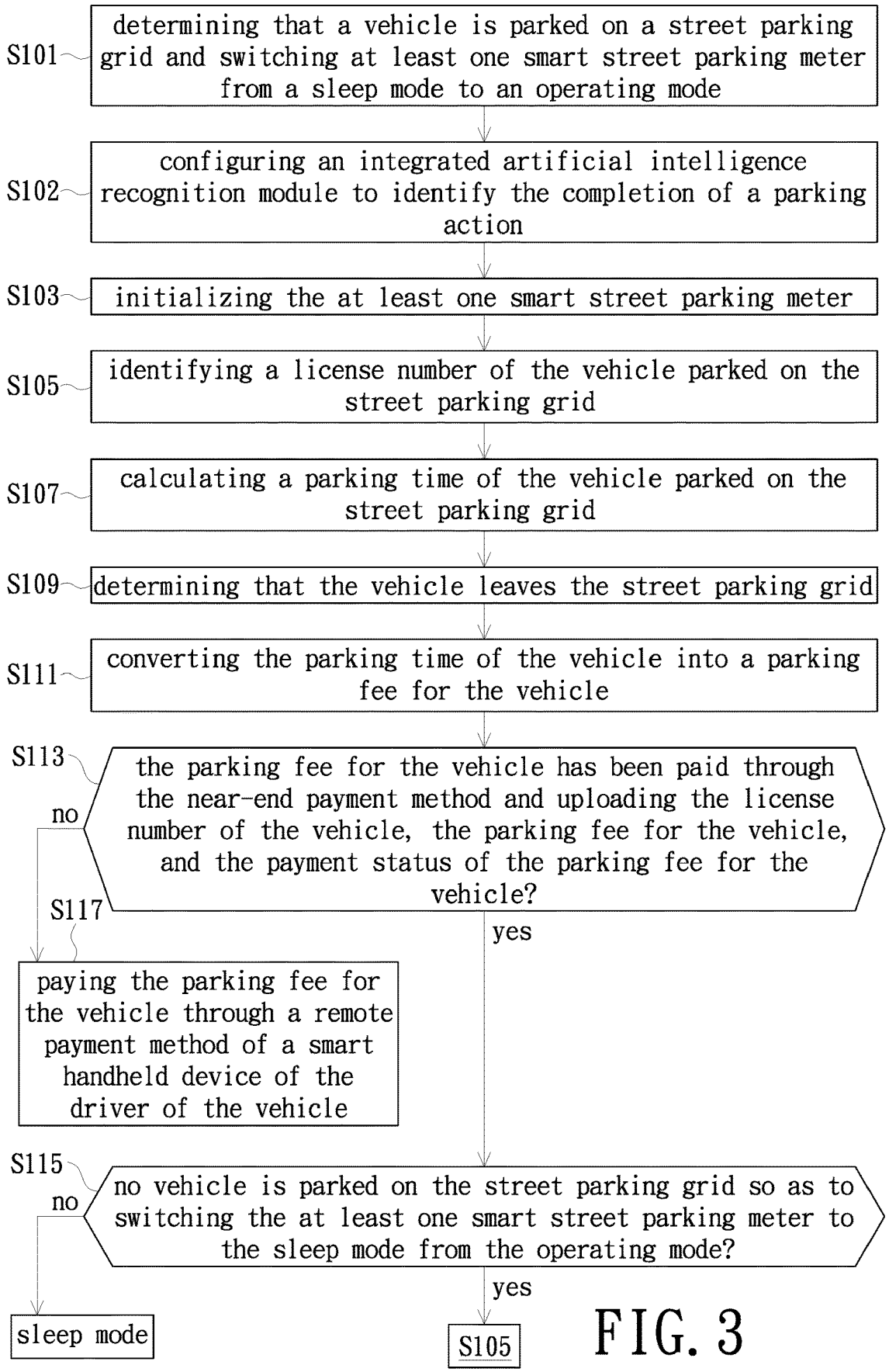
FIG. 3 is a flowchart of a smart street parking fee payment method according to an embodiment of the present invention.

FIG. 3 is a flowchart of a smart street parking fee payment method according to an embodiment of the present invention. As shown in FIG. 3, the smart street parking fee payment method provided by an embodiment of the present invention is applicable to the smart street parking management system 1 including at least one smart street parking meter 2 and a smart cloud parking management server 3. The smart street parking fee payment method includes the following steps: determining that there is a vehicle parked on a street parking grid and returning the at least one smart street parking meter from a sleep mode to an operating mode (S101); configuring an integrated artificial intelligence recognition module to identify the completion of a parking action (S102); initializing the at least one smart street parking meter (S103); identifying a plate number of the vehicle parked on the street parking grid (S105); calculate a parking time of the vehicle parked on the street parking grid (S107); determining that the vehicle leaves the street parking grid (S109); converting the parking time of the vehicle to a parking fee for the vehicle (S111); determining whether the parking fee of the vehicle has been paid through a near-end payment method and uploading the plate number of the vehicle, the parking fee of the vehicle, and a payment status of the parking fee of the vehicle (S113); determining whether there is a vehicle parked on the street parking grid, so that the at least one smart street parking meter is switched from the operating mode to the sleep mode (S115); and paying the parking fee through a remote payment method of a smart handheld device of the driver of the vehicle (S117). It is to be noted that steps S109 and S111 can be interchanged with each other according to actual operating conditions. For example, the driver of the vehicle may pay the parking fee first and then drive the vehicle away from the street parking grid, or drive the vehicle away from the street parking grid first and then pay the parking fee. That is, steps S109 and S111 may be interchanged with each other according to actual operating conditions, and the present invention does not limit the order of steps S109 and S111.

In step S101, the integrated artificial intelligence recognition module 21 determines that a vehicle is parked on the street parking grid and switches the at least one smart street parking meter 2 from the sleep mode to the operating mode.

In step S102, the integrated artificial intelligence recognition module 21 identifies the completion of a parking action of the vehicle parked on the street parking grid.

In step S103, the central processing unit 22 initializes the at least one smart street parking meter 2 and detects and determines whether the battery status of the rechargeable battery 262 of the at least one smart street parking meter 2 is sufficient to supply power to the smart street parking meter 2.

In step S105, the central processing unit 22 recognizes the plate number of the vehicle parked on the street parking grid through the near-end payment circuit 23. When the central processing unit 22 cannot recognize the plate number of the vehicle parked on the street parking grid through the near-end payment circuit 23, the central processing unit 22 uploads the park information indicating that the plate number of the vehicle parked on the street parking grid cannot be recognized to the smart cloud parking management server 3 through the wireless networking circuit 25, and the smart cloud parking management server 3 then notifies inspectors to calculate the parking time and parking fee of the vehicle parked on the street parking grid.

In step S107, the central processing unit 22 calculates a parking time from when the vehicle is parked on the street parking grid to when the vehicle leaves the street parking grid.

In step S109, the central processing unit 22 determines that the vehicle leaves the street parking grid through the integrated artificial intelligence recognition module 21.

In step S111, the central processing unit 22 converts the parking time of the vehicle into a parking fee for the vehicle.

In step S113, the smart street parking fee payment method goes to step S115 when the central processing unit 22 determines that the driver of the vehicle has paid the parking fee of the vehicle through a near-end payment method and uploads the plate number of the vehicle, the parking fee of the vehicle, and a payment status of the parking fee of the vehicle through the wireless networking circuit 25. Alternatively, the smart street parking fee payment method goes to step S117 when the central processing unit 22 determines that the driver of the vehicle has not paid the parking fee of the vehicle through the near-end payment method and uploads the plate number of the vehicle, the parking fee of the vehicle, and a payment status of the parking fee of the vehicle through the wireless networking circuit 25.

In step S115, the at least one smart street parking meter 2 is switched from the operating mode to the sleep mode when the central processing unit 22 determines that no vehicle is parked on the street parking grid. The smart street parking fee payment method goes to step S105 when it is determined that a vehicle is parked on the street parking grid.

In step S117, the parking fee of the vehicle is paid to the smart cloud parking management server 3 through the remote payment method of the driver's smart handheld device 5. The remote payment method may include any method that does not belong to the driver paying the parking fee of the vehicle parked on the street parking grid on the smart street parking meter 2. Therefore, the present invention does not limit the remote payment method.

In summary, the smart street parking meter, the smart street parking management system and the smart street parking fee payment method provided in the embodiments of the present invention can effectively reduce the labor cost and errors caused by manual operation. In addition, by introducing the smart street parking management system and providing the driver with an application, drivers can easily find street parking grids and use electronic ticket multi-payment technology to pay parking fees. As a result, some advantages such as the smart street parking management system recording the vehicle information of vehicles parked on the street parking grid and managing the status of the street parking grids, reducing labor costs, assisting drivers to quickly search for parking spaces to reduce vehicle pollution, and providing drivers with multiple ways to pay parking fees to reduce payment time are achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A smart street parking management system, comprising:
   at least one smart street parking meter, wherein each of the smart street parking meter comprises an integrated artificial intelligence recognition module, a central processing unit, a near-end payment circuit, a touch screen, a wireless networking circuit and a power supply circuit, the integrated artificial intelligence recognition module is configured to detect a vehicle parked on at least one street parking grid, the integrated artificial intelligence recognition module comprises a radar detection circuit, a lidar detection circuit and an image recognition circuit, wherein, the integrated artificial intelligence recognition module selects at least one of the radar detection circuit, the lidar detection circuit and the image recognition circuit to detect the vehicle parked on the at least one street parking grid, the central processing unit is connected to the integrated artificial intelligence recognition module and configured to calculate a parking time from when the vehicle is parked on the at least one street parking grid to when the vehicle leaves the at least one street parking grid and convert the parking time of the vehicle into a parking fee of the vehicle, the near-end payment circuit is connected to the central processing unit and configured to identify a plate number of the vehicle parked on the at least one street parking grid and pay the parking fee for the vehicle, the touch screen is connected to the central processing unit and configured to display parking information of the vehicle and provide a driver of the vehicle to select a near-end payment method for the parking fee of the vehicle, the wireless networking circuit is connected to the central processing unit and configured to regularly upload the parking information of the vehicle and status information of the smart street parking meter to a smart cloud parking management server through a wireless networking technology to record the parking information of the vehicle and the status information of the smart street parking meter, and the power supply circuit is connected to and configured to provide power to the integrated artificial intelligence identification module, the central processing unit, the near-end payment circuit, the touch screen and the wireless networking circuit;
the smart cloud parking management server, connected to the at least one smart street parking meter through the wireless networking technology and configured to regularly receive the parking information of the vehicle parked on the at least one smart street parking grid and the status information of the at least one smart street parking meter uploaded by the at least one smart street parking meter to record the parking information of the vehicle and the status information of the at least one smart street parking meter; and
at least one smart handheld device, connected to the smart cloud parking management server through an application;
wherein the status information of the at least one smart street parking meter comprises an empty-space status of the at least one street parking grid detected by the at least one smart street parking meter and a battery status of a rechargeable battery of the at least one smart street parking meter;
wherein the parking information of the vehicle comprises the plate number of the vehicle, the parking fee of the vehicle, and a payment status of the parking fee of the vehicle;
wherein the driver of the vehicle pays the parking fee of the vehicle through a remote payment method through the at least one smart handheld device;

wherein the driver of the vehicle queries the empty-space status of the at least one street parking grid detect by the at least one smart street parking meter through the at least one smart handheld device.

2. A smart street parking fee payment method applicable to a smart street parking management system, wherein the smart street parking management system comprises at least one smart street parking meter and a smart cloud parking management server, wherein each of the smart street parking meter comprises an integrated artificial intelligence recognition module, a central processing unit, a near-end payment circuit, a touch screen, a wireless networking circuit and a power supply circuit, the integrated artificial intelligence recognition module is configured to detect a vehicle parked on at least one street parking grid, the integrated artificial intelligence recognition module comprises a radar detection circuit, a lidar detection circuit and an image recognition circuit, wherein, the integrated artificial intelligence recognition module selects at least one of the radar detection circuit, the lidar detection circuit and the image recognition circuit to detect the vehicle parked on the at least one street parking grid, the central processing unit is connected to the integrated artificial intelligence recognition module and configured to calculate a parking time from when the vehicle is parked on the at least one street parking grid to when the vehicle leaves the at least one street parking grid and convert the parking time of the vehicle into a parking fee of the vehicle, the near-end payment circuit is connected to the central processing unit and configured to identify a plate number of the vehicle parked on the at least one street parking grid and pay the parking fee for the vehicle, the touch screen is connected to the central processing unit and configured to display parking information of the vehicle and provide a driver of the vehicle to select a near-end payment method for the parking fee of the vehicle, the wireless networking circuit is connected to the central processing unit and configured to regularly upload the parking information of the vehicle and status information of the smart street parking meter to a smart cloud parking management server through a wireless networking technology to record the parking information of the vehicle and the status information of the smart street parking meter, and the power supply circuit is connected to and configured to provide power to the integrated artificial intelligence identification module, the central processing unit, the near-end payment circuit, the touch screen and the wireless networking circuit, the smart cloud parking management server is connected to the at least one smart street parking meter through the wireless networking technology and configured to regularly receive the parking information of the vehicle parked on the at least one smart street parking meter and the status information of the at least one smart street parking meter uploaded by the at least one smart street parking meter to record the parking information of the vehicle and the status information of the at least one smart street parking meter, the status information of the at least one smart street parking meter comprises an empty-space status of the at least one street parking grid detected by the at least one smart street parking meter and a battery status of a rechargeable battery of the at least one smart street parking meter, the parking information of the vehicle comprises the plate number of the vehicle, the parking fee of the vehicle, and a payment status of the parking fee of the vehicle, and the smart street parking fee payment method comprises steps of:

determining that the vehicle is parked on the at least one street parking grid and switching the at least one smart street parking meter from a sleep mode to an operating mode;

initializing the at least one smart street parking meter;

identifying the plate number of the vehicle parked on the at least one the street parking grid;

calculating the parking time of the vehicle parked on the at least one the street parking grid;

determining that the vehicle leaves the at the least one street parking grid;

converting the parking time of the vehicle into the parking fee for the vehicle;

determining that the parking fee for the vehicle has been paid through the near-end payment method and uploading the plate number of the vehicle, the parking fee for the vehicle, and the payment status of the parking fee for the vehicle; and switching the at least one smart street parking meter to the sleep mode from the operating mode when it is determined that no vehicle is parked on the at least one street parking grid.

3. The smart street parking fee payment method according to claim 2, further comprising steps of:

determining that the parking fee for the vehicle has not been paid and uploading the plate number of the vehicle, the parking fee for the vehicle, and the payment status of the parking fee for the vehicle; and paying the parking fee for the vehicle through a remote payment method of a smart handheld device of the driver of the vehicle.

4. The smart street parking fee payment method according to claim 3, wherein the driver of the vehicle queries an empty-space status of the at least one street parking grid detect by the at least one smart street parking meter through the smart handheld device.

5. The smart street parking fee payment method according to claim 2, wherein the step of initializing the at least one smart street parking meter further comprises a step of:

detecting the battery status of the rechargeable battery of the at least one smart street parking meter.

6. The smart street parking management system according to claim 1, wherein the power supply circuit comprises an AC-DC conversion circuit and a rechargeable battery, and the AC-DC conversion circuit is connected to the rechargeable battery to charge the rechargeable battery and provide power to the smart street parking meter.

7. The smart street parking management system according to claim 1, wherein when the central processing unit determines that no vehicle is parked on the at least one street parking grid, the smart street parking meter is switched from an operating mode to a sleep mode and the integrated artificial intelligence recognition module continuously detects whether there is a vehicle parked on the at least one street parking grid.

8. The smart street parking management system according to claim 7, wherein when the integrated artificial intelligence recognition module detects that the vehicle is parked on the at least one street parking grid, the smart street parking meter is switched from the sleep mode to the operating mode and the central processing unit initializes the smart street parking meter.

9. The smart street parking management system according to claim 8, wherein the central processing unit initializing the smart street parking meter comprises the central processing unit detecting whether a battery status of a rechargeable battery of the power supply circuit is sufficient to supply power to the smart street parking meter.

\* \* \* \* \*